United States Patent [19]
Mathai et al.
[11] Patent Number: 4,854,500
[45] Date of Patent: Aug. 8, 1989

[54] APPARATUS AND METHOD TO PRODUCE CHARGED FOG

[75] Inventors: C. V. Mathai, Rowland Heights, Calif.; Lyle A. Rathbun, Kennewick, Wash.; John S. Kinsey, Lee's Summit, Mo.

[73] Assignee: Aerovironment, Inc., Monrovia, Calif.

[21] Appl. No.: 611,875

[22] Filed: Jul. 30, 1984

Related U.S. Application Data

[63] Continuation of Ser. No. 341,861, Jan. 22, 1982, abandoned.

[51] Int. Cl.[4] .......................... B05B 3/08; B05B 3/10; B05B 5/04

[52] U.S. Cl. .......................................... 239/3; 239/7; 239/214.11; 239/214.25; 239/223; 239/290; 239/703; 239/705

[58] Field of Search ............ 239/2 R, 3, 7, 14, 214.11, 239/214.19, 214.25, 223, 290, 691, 700, 701, 703, 705

[56] References Cited

U.S. PATENT DOCUMENTS

| | | | |
|---|---|---|---|
| 1,605,629 | 11/1926 | Warner | 239/214.19 |
| 2,088,833 | 8/1937 | Beman | 239/214.25 X |
| 2,108,621 | 2/1938 | Straitz | 239/214.25 X |
| 3,000,574 | 9/1961 | Sedlacsik | 239/703 |
| 4,017,029 | 4/1977 | Walberg | 239/691 |

FOREIGN PATENT DOCUMENTS

| | | | |
|---|---|---|---|
| 111035 | 11/1925 | Switzerland | 239/214.19 |

*Primary Examiner*—Andres Kashnikow
*Attorney, Agent, or Firm*—WIlliam W. Haefliger

[57] ABSTRACT

Electrostatically charged liquid such as water is supplied via rotating structure to impinge on a baffle. The latter deflects the charged liquid onto a rotating insulative, frusto-conical surface on which the charged liquid forms a film which flows forwardly to an annular edge. Gas such as air, sweeping past the edge, impacts the layer arriving at the edge and produces fine charged droplets of the liquid, forming a fog. This charged fog is usable for suppressing dust particles in the air.

18 Claims, 2 Drawing Sheets

APPARATUS AND METHOD TO PRODUCE CHARGED FOG

This is a continuation of application Ser. No. 341,861, filed Jan. 22, 1982, now abandoned.

BACKGROUND OF THE INVENTION

This invention relates generally to devices and apparatus used in controlling emissions as from industrial sources, and more particularly concerns electrically charged fog generating or throwing apparatus useful in inhalable particle control.

Although progress has been made in the past in controlling emissions from conventional industrial sources, air pollution regulator agencies are becoming increasingly concerned with the non-attainment of ambient total suspended particulate matter standards, due mainly to fugitive emissions from various sources. In the past, fugitive emissions have been of concern only from a nuisance standpoint, increasing soiling potential and decreasing atmospheric visibility only in the immediate vicinity of the source. It has also been recognized that inhalable particles (<15 μm), fine particles (<2.5 μm) in particular, have a dominant role in causing hazards to human health and degradation of visibility. The fine particles can remain in the atmosphere for extended periods and can be transported over long distances.

Indiscriminate spraying of large amounts of water has been the most common control melthod used in mines and other fugitive emission sources and it has been only marginally successful. In a mine atmosphere, 30–40% is the accepted value for the dust control efficiency of water sprays. However, even this method has problems with clogged water spray nozzles and the need for large quantities of water.

It has been known that industrial pollutants and naturally occuring fugutive dusts acquire electrostatic charges as they are dispersed into the air. It is also known that the charge on fine particles of fugitive emission is usually negative. Therefore, if oppositely charged water droplets are sprayed on the dust to be suppressed, the particles which collide with the charged droplets will agglomerate rapidly and settle out of the atmosphere. The collection efficiency of water sprays can be improved significantly if well-charged water droplets (fog) of approximately 20 to 200 μm diameter can be generated. Commercially available instruments to generate charged fog use either a standard pressure-type or twin-fluid nozzle to atomize the water, thus necessitating a substantial supply of high pressure water or air for proper atomization. These types of nozzles have a tendency to clog if the water supply contains a high concentration of suspended salts.

SUMMARY OF THE INVENTION

It is a major objective of the invention to provide a solution to the above problems and to meet the need as will appear herein. Basically, apparatus to produce charged fog embodying the invention comprises:

(a) means defining a rotating inner annular surface having an axis of rotation and flaring forwardly in the direction of that axis, and having a terminal circular edge, said surface facing the axis, (b) means supplying electrostatically charged liquid to the rotating surface whereby the liquid forms a layer on the rotating surface and moves forwardly on the surface toward the edge, and (c) means supplying a high velocity gas stream flowing past the edge to impact the liquid moving off said edge and to produce fine charged droplets of the liquid forming a fog.

As will appear, the liquids may be electrostatically charged prior to its supply to the rotating, flared surface, the charge emanating from a direct current, high voltage source typically between 6,000 and 15,000 volts, D.C., and the fog spray pattern may be controlled.

These and other objects and advantages of the invention, as well as the details of an illustrative embodiment, will be more fully understood from the following specification and drawings, in which:

DRAWING DESCRIPTION

Figure 2:
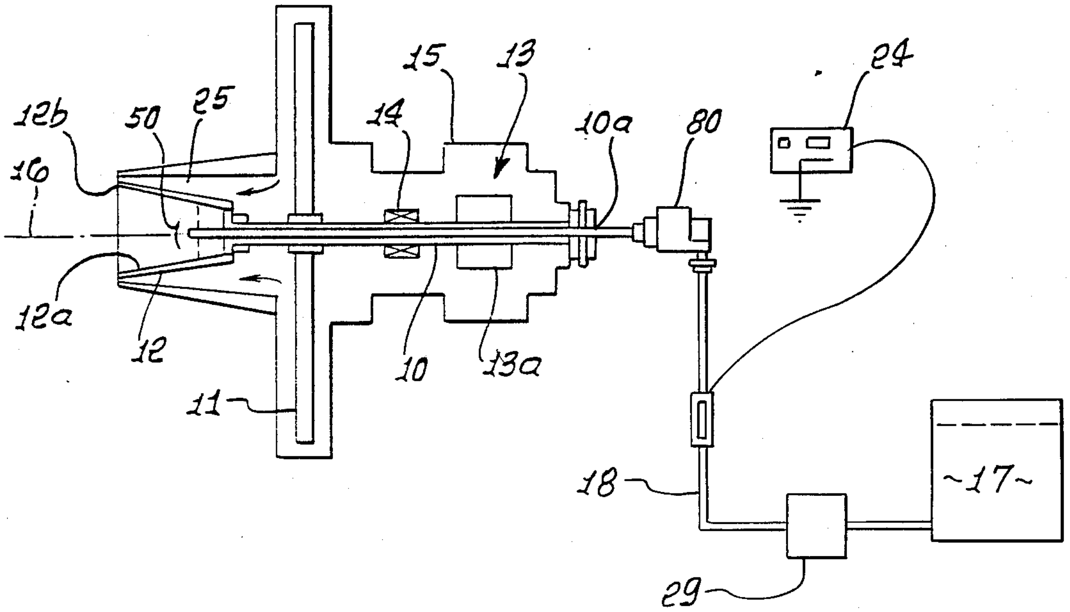
FIG. 2 is a schematic showing of fogger apparatus constructed in accordance with the invention.
Figure 3:
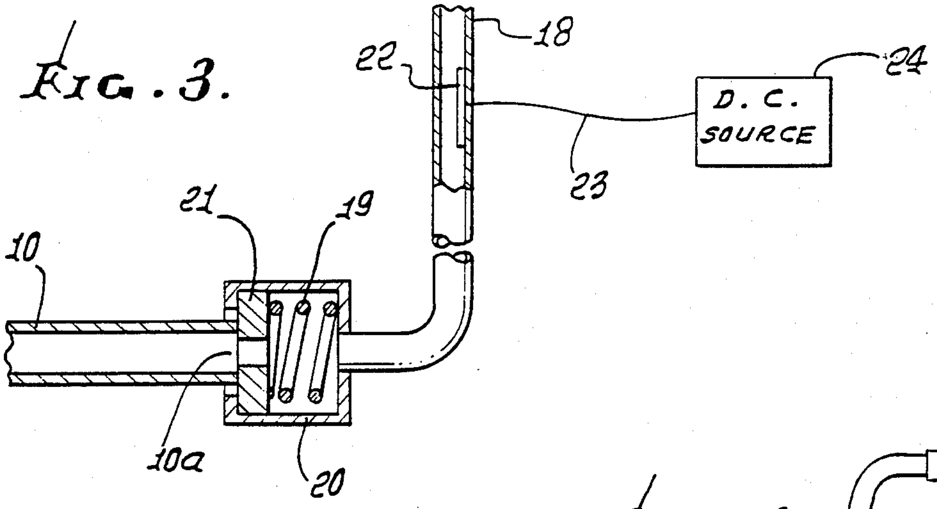
Figure 4:
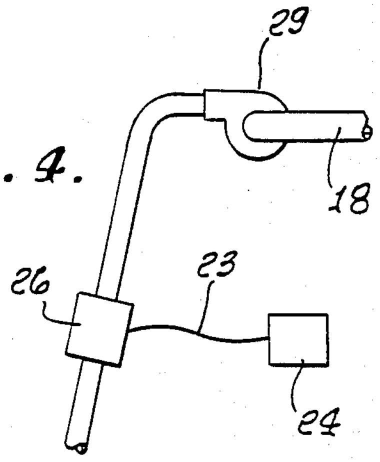
Figure 2A:
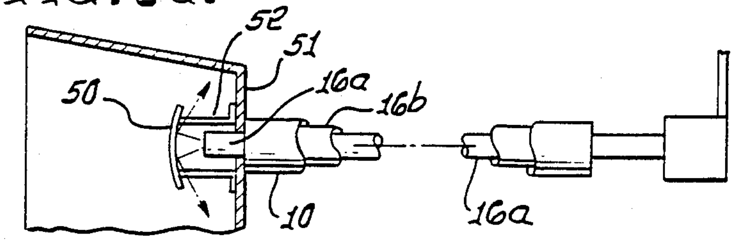

FIG. 2*a* is an enlarged fragmentary side elevation;

FIG. 3 is a cross section taken through a rotating seal;

FIG. 4 is a fragmentary view showing a modification; and

Figure 5:
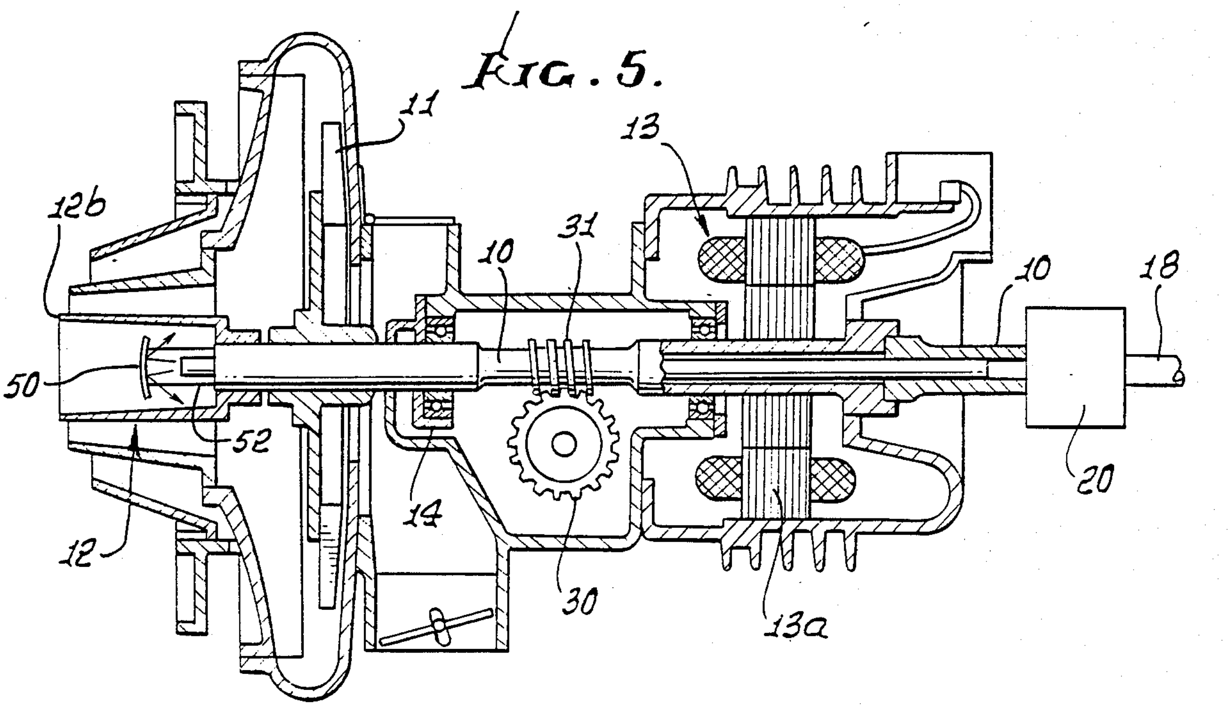

FIG. 5 is a vertical section taken through apparatus as in FIG. 2, incorporating the invention.

DETAILED DESCRIPTION

A mathematical relationship describing the collection efficiency, E, of suspended particles by water droplets is given by $$E = 1 - \exp\left[ -\frac{3}{2} \cdot \frac{Q_l}{Q_g} \cdot \frac{L}{D} \cdot \eta \right]$$

where $Q_l$ is the volumetric water flow rate, $Q_g$ is the volumetric gas flow rate, L is the characteristic length for the total capture process, D is the mass median droplet diameter and $\eta$ is the single droplet collision efficiency.

The single droplet collision efficiency depends on the droplet diameter and its lifetime in the air. Collision efficiency is assumed to be identical to collection efficiency, i.e. a droplet and particle, having collided, stay together and settle out of the air. It is determined by several mechanisms of interaction between the droplet and the particles which collide with it. These mechanisms include direct interception, inertial impaction, Browniam diffusion, and electric, diffusiophoretic, and thermophoretic forces. The dominant mechanism for large particles (>1 μm radius) is impaction and interception and for small particles it is Browniam diffusion. To obtain best collection efficiency, the droplets must be small enough to provide both an adequate spray rate per volume of gas treated and sufficient contact time, yet large enough not to evaporate too quickly. The lifetime of a water droplet depends on the temperature and relative humidity of the medium into which it is introduced.

Figure 1:
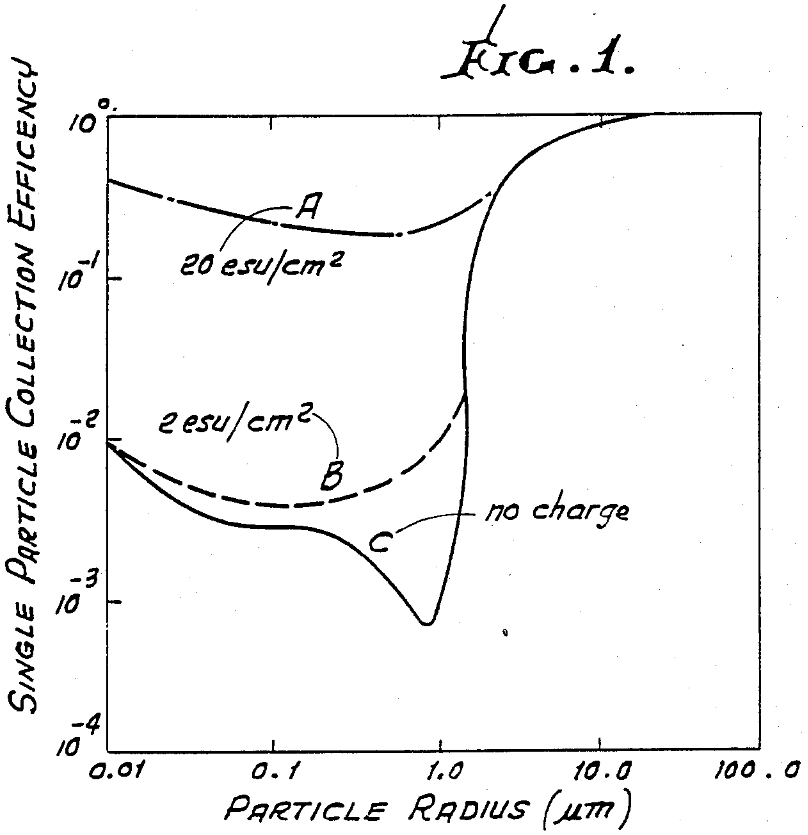
FIG. 1 is a plot of single particle collection efficiency vs parpticle radius for a 106 μm radius droplet.

Single droplet collection efficiency varies with particle radius, droplet radius, relative humidity, and electric charge on the droplet. In FIG. 1 it may be noticed that the collection efficiency of larger particles is greater for larger droplets while the collection efficiency of smaller paprticles is greater for smaller droplets. The minimum in E occurs near a particle radius of ~1 μm (due to the ineffectiveness of different interaction mechanisms) and, for droplets less than ~55 μm radius, E becomes infinitely low giving rise to the so called "Greenfield gap." Collection efficiency increases with decreasing relative humidity for smaller particles and E is independent of relative humidity for larger particles. The introduction of electric charge on the aerosol particles and water droplets completely eliminates the minimum in E and substantially increases the collection efficiency of water droplets depending on the amount of charge on the droplets and particles. The collection efficiency over a continuous distribution of aerosol particle sizes by water droplets having a spectrum of radii may be quite different from the case of a single droplet.

Referring now to FIG. 2, a hollow shaft 10 mounts a fan 11 and an atomizing (non-metallic) cup 12. The rotor 13*a* of an electrical motor 13 is also carried on the shaft to rotate the shaft during motor operation. Suitable bearings may be provided, as indicated schematically at 14. A casing for the apparatus is indicated at 15, and extends about the motor, fan and cup.

Means is provided to supply electrostatically charged liquid, such as water for example, to the rotating inner surface 12*a* of the cup. FIGS. 2 and 2*a* show such means as including an inner plastic tube 16*a*, with a TYGON (plastic) tube 16*b* fitted thereabout and within hollow metal shaft 10. A baffle 50 is carried at the end of the projecting tube 16*a* so that water or liquid discharged from the tube 16*a* is deflected laterally and strikes the spinning inner surface of the cup, normal to hat surface and near the cup inner wall 51. Baffle 50 is attached to the cup, as by legs 52. Surface 12*a* flares forwardly (leftwardly) and outwardly as shown, relative to central axis 16, the surface 12*a* terminating at an annular edge 12*b*. As a result, the charged liquid forms a layer on the rotating surface, and moves forwardly thereon toward edge 12*b*. The charged liquid supply means is shown to include an insulated supply 17 from which liquid flows via a non-conductive (for example plastic) tube or line 18 to the entrance end of rotating hollow shaft 10, indicated at 10*a*. A seal may be provided at that location, as for example is seen in FIG. 3. Note the annular wear ring 21 urged against the rotating end of the shaft as by a spring 19, in a housing 20. The seal is shown at 80.

High voltage is supplied to the flowing liquid in line 18, as via an electrode 22 located in the line, and to which a lead 23 is connected, as shown in FIG. 3. The high voltage DC source is indicated at 24, the voltage level being variable between zero and 15,000 volts for electrostatically charging water in line 18. Line 18, tube 16*a* and cup 12 typically consist of electrically insulative plastic material, as for example TEFLON or NYLON.

Liquid flowing in the tube 16*a* is discharged into the cup, rotated for example at between 3,000 and 4,000 rpm. Because of centrifugal forces, the liquid is converted to a thin film moving forward on surface 12*a* toward and off edge 12*b*, where it is contacted by a high velocity air stream produced by the rotating fan 11. The air flows forwardly in converging space 25, to impact the liquid and produce electrically charged fog, the droplets of which are electrostatically charged for particle control. A pump 29 is employed in line 18, as shown in FIG. 4, upstream of a flow meter 26 wherein the electrode 22 is located. In a typical example, the spray pattern covers about 30 to 40 square feet when the water flow rate is about 16 gallons per hour.

The size distribution of the water droplets was measured using a cloud optical array probe for droplets in the range of 30 to 300 μm (diameter) and a precipitation optical array probe for droplets in the range of 125 to 1,875 μm. These measurements gave a concentration median droplet diameter of 100 μm and a mass median droplet diameter of ~200 μm. These determinations were supplemented by microscope measurements of droplets collected on greased glass slide, with a correction factor of 1.26 applied to account for the change in shape of droplets on slides. This method gave a value of ~90 μm for droplet median concentration diameter.

FIG. 5 shows, in greater detail, one atomizing apparatus usable in accordance with the invention. The shaft 10 is axially adjustable, as by rotation of gear 30 engageable with threading 31 on the shaft, to adjust the air flow surrounding the cup, for fog pattern control.

Additional advantages include:

(1) By directly charging the inflowing liquid, the charges on the droplets are made substantially uniform, and the charge to mass ratio is substantially increased by about an order of magnitude over foggers which employ induction rings, to charge the water droplets.

(2) Only ordinary 110 volt commercial electric power is required (with AC to DC conversion), and total power requirements are at most about 1/7 those of induction ring foggers, compressed air not being required.

(3) Application of the fog thus generated to the control of inhalable particles provides 90% or better fine particle control efficiency and therefore represents a substantial improvement over prior wet suppression methods.

In an operating example, pressurized water from the tank flows into the atomizing cup which is rotating at 3600 rpm. Because of the centrifugal action, the water forms a thin layer inside the cup and moves forward into a high velocity air stream. The impact of the high velocity air on the thin film of water inside the spinning cup instantly breaks the water film into fine droples, thus generating fog. The air flow speed, and thus the spray pattern can be adjusted using an air butterfly setting.

The droplets are electrically charged by directly connecting a 15 KV D.C. source to the inflowing water and electrically floating the water at this high potential. The charge-to-mass ratio of the water droplets, which is the critical parameter in determiningn the particle collection efficiency, has a typical value of $1.2\times10^{-6}$C./gm. The size distribution of the droplets was determined with an optical array probe which gave a typica median concentration diameter of about 100 μm. Preliminary results of the field tests of this device indicate a doubling of the particle collection efficiency for inhalable particles (under all tested instrument settings) and about three times for fine particles compared with uncharged water sprays. Power requirements are less than 1 kilowatt; and particle control efficiencies of over 90% for fine particles (less than 2.5 μm in aerodynamic diameter) were obtained under optimum instrument settings.

Other rotating seals can be used, as for example those manufactured by Devblin Company, Northbrook, Illinois.

We claim:

1. Apparatus to produce electrically charged fog, comprising (a) means including a cup defining a rotating inner annular surface having an axis of rotation, said surface flaring forwardly in the direction of said axis and having a terminal circular edge, said surface facing said axis, said surface consisting of insulative material, (b) means supplying electrostatically charged liquid to said rotating surface whereby the liquid forms a layer on the rotating surface and moves forwardly on said surface toward said edge, and (c) means supplying a high velocity gas stream flowing forwardly about the cup and past said edge to impact the liquid moving off said edge and to produce fine charged droplets of the liquid forming a fog.

(d) said means supplying charged liquid including a hollow insulative tube and a hollow shaft receiving said tube, there being a motor rotating said shaft, (e) and a baffle in said cup, the shaft having an end facing the baffle and spaced therefrom, and said tube projecting in the cup to terminate proximate and openly facing the baffle, said edge spaced forwardly of said baffle.

2. The apparatus of claim 1 wherein said means supplying charged liquid includes a source of said liquid, which consists essentially of water.

3. The apparatus of claim 1 wherein said means supplying said gas stream includes ducting to supply said gas stream which consists essentially of air.

4. The apparatus of claim 1 wherein said means supplying charged liquid includes a DC voltage source operatively connected with a line within which said liquid flows to said surface.

5. The apparatus of claim 4 including an electrode in said line to contact said liquid, and said DC source is connected with said electrode.

6. The apparatus of claim 1 wherein said means supplying the gas stream comprises a fan rotated by a shaft extending about the shaft.

7. The apparatus of any one of claims 1-6 wherein said liquid comprises water.

8. The apparatus of claim 6 wherein said baffle rotates with the tube and cup and is located to deflect liquid discharging from said tube laterally toward a side wall defined by the cup, the baffle having legs attached to an end wall defined by the cup.

9. The apparatus of claim 8 including a seal at the opposite end of the tube for sealing off between the rotating tube and a non-rotating line via which liquid is supplied to the tube.

10. The apparatus of claim 9 including structure supporting said shaft for rotation, the tube projecting from opposite ends of said shaft.

11. In the method of producing fog, and employing means defining a rotating insulative inner annular surface having an axis of rotation, said surface flaring forwardly in the direction of said axis and having a terminal circular edge, said surface facing said axis, and a baffle, the steps that include (a) supplying electrostatically charged liquid via an insulative tube to impinge on the baffle, and rotating the baffle to centrifugally deflect the charged liquid onto said rotating surface, whereby the liquid forms a layer on the rotating surface and moves fowardly on said surface toward said edge, (b) and supplying a high velocity gas stream flowing past said edge to impact the liquid moving off said edge and to produce fine charged droplets of the liquid forming a fog.

12. The method of claim 11 wherein said liquid consists of water.

13. The method of claim 11 wherein between 6,000 and about 15,000 volts DC is supplied to said liquid being supplied to said surface.

14. Apparatus to produce electrically charged fog, comprising (a) means including an insulative cup defining a rotating inner annular surface having an axis of rotationn, said surface flaring forwardly in the direction of said axis and having a terminal circular edge, said surface facing said axis, (b) means including a hollow insulative tube rotating with said rotating surface and supplyingn electrostatically charged liquid to said rotating surface whereby the liquid forms a layer on the rotating surface and moves forwardly on said surface toward said edge, there being a baffle rotating with the tube and surface and located inwardly of said surface and forwardly of a liquid discharge end defined by said tube to deflect liquid discharging from said end of said tube laterally toward said rotating annular surface, there being a hollow shaft receiving the tube, said insulative cup having one end thereof mounted on said shaft and rotated thereby, and a motor rotating the shaft, and a baffle in said cup, the shaft having an end facing the baffle and spaced therefrom, and said tube projecting in the cup to terminate proximate and openly facing the baffle, said edge spaced forwardly of said baffle, (c) means supplying a high velocity gas stream flowing forward and openly about said cup and forwardly past said edge to impact the liquid moving off said edge and to produce fine charged droplets of the liquid carried forwardly and forming a fog, and (d) a seal at the opposite end of the tube for sealing off between the rotating tube and a non-rotating line via which liquid is supplied to the tube, an electrode in said non-rotating line to contact said liquid, and a DC voltage source connected with said electrode, (e) said (c) means including a fan and a hollow drive shaft rotating about said axis, the fan supplying said gas stream.

15. The apparatus of claim 14 wherein said means supplying charged liquid includes a source of said liquid, which consists essentially of water, said voltage applied to the electrode being between 6,000 and 9,000 volts.

16. Apparatus to produce electrically charged fog, comprising (a) means including an insulative cup defining a rotating inner annular surface having an axis of rotation, said surface flaring forwardly in the direction of said axis and having a terminal circular edge, said surface facing said axis, (b) means including a hollow insulative tube rotating with said rotating surface and supplying electrostatically charged liquid to said rotating surface whereby the liquid forms a layer on the rotating surface and moves forwardly on said surfaces toward said edge, there being a baffle rotating with the tube and surface and located inwardly of said surface and forawrdly of a lilquid discharge end defined by said tube to deflect liquid discharging from said end of said tube laterally toard said rotating annular surface, said insulative cup mounted on said insulative tube rotated thereby and a motor rotating the tube, (c) means supplying a high velocity gas stream flowingn forwardly and openly about said cup and past said edge to impact the liquid moving off said edge and to produce fine charged droplets of the liquid carried forwardly and forming a fog, said means including structure extending about the cup and forming therewith a forwardly convergent space terminating proximate said edge, and (d) a seal at the opposite end of the tube for sealing off between the rotating tube and a non-rotating line via which liquid is supplied to the tube, an electrode in said non-rotating line to contact said liquid, and a DC voltage source connected with said electrode, (e) said means supplying charged liquid including a source of said liquid, which consists essentially of water, said voltage applied to the electrode being between 6,000 and 9,000 volts, (f) said (c) means including a fan and a hollow drive shaft rotating about said axis to supply said gas stream, and ducting extending abou said cup to supply said gas stream which consists essentially of air, said tube projecting within said shaft and into said cup, into proximity to said baffle, (g) there being structure supporting said shaft for rotation, the tube projecting from opposite ends of the hollow shaft, and there being means for displacing the shaft axially, to thereby adjust the position of the cup, and said cup edge, relative to said forwardly convergent space.

17. In the method of producing fog, and employing means defining a rotating and insulative inner annular surface having an axis of rotation, said surface flaring forwardly in the direction of said axis and having a terminal circular edge, said surface facing said axis, and also employing rotating insulative tubular means mounting said surface, and a baffle, the steps that include (a) supplying previously electrostatically charged water via an insulative tube to impinge on the baffle, and rotating the baffle to centrifugally deflect the charged liquid onto said rotating surface whereby the water forms a layer on the rotating surface and moves forwardly on said surface toward said edge, (b) supplying a high velocity gas stream flowing about and past said edge to impact the liquid moving off said edge and to produce fine charged droplets of the water carried forwardly and forming a fog, (c) and supplying between 6,000 to 9,000 volts DC to said water being supplied to said surface via said rotating insulative means.

18. The method of claim 17 including providing a hollow drive shaft to extend about said insulative tubular means, and providing a fan on said shaft, and rotating said shaft and fan to supply said gas stream, and also rotating said insulative tubular means.

* * * * *